United States Patent
Chang et al.

(10) Patent No.: US 8,792,192 B2
(45) Date of Patent: Jul. 29, 2014

(54) LENS BARREL AND LENS MODULE

(75) Inventors: Kuo-Wen Chang, Taichung (TW);
Min-Wei Lee, Taichung (TW)

(73) Assignee: GeniuS Electronic Optical Co., Ltd.
(TW)

( * ) Notice: Subject to any disclaimer, the term of this patent is extended or adjusted under 35 U.S.C. 154(b) by 52 days.

(21) Appl. No.: 13/591,412

(22) Filed: Aug. 22, 2012

(65) Prior Publication Data
US 2013/0182342 A1 Jul. 18, 2013

(30) Foreign Application Priority Data

Jan. 18, 2012 (TW) .............................. 101101945 A (51) Int. Cl.
*G02B 7/02* (2006.01)
*G03B 17/00* (2006.01)
*G03B 17/14* (2006.01)

(52) U.S. Cl.
CPC . *G02B 7/022* (2013.01); *G02B 7/02* (2013.01); *G03B 17/14* (2013.01)
USPC .......................................... 359/829; 396/533

(58) Field of Classification Search
USPC ......... 359/503, 694, 699–701, 703, 704, 811, 359/819, 820, 822, 823, 825, 826, 827, 829, 359/830; 396/529, 530, 533, 544; 353/100, 353/101; 411/411, 413, 416–418, 422, 423
See application file for complete search history.

(56) References Cited

U.S. PATENT DOCUMENTS

| 6,340,277 | B1 * | 1/2002 | Koenig et al. ................ 411/416 |
| 7,565,078 | B2 * | 7/2009 | Liu et al. ........................ 396/533 |
| 7,748,916 | B2 * | 7/2010 | Li ................................... 396/529 |
| 8,164,843 | B2 * | 4/2012 | Ho ................................. 359/829 |
| 2006/0103953 | A1 * | 5/2006 | Lee et al. ....................... 359/819 |
| 2013/0308216 | A1 * | 11/2013 | Matsumoto et al. .......... 359/829 |

FOREIGN PATENT DOCUMENTS

| EP | 0372780 A2 * | 6/1990 | ............... B29D 1/00 |
| WO | WO 2010064400 A1 * | 6/2010 | ............... G02B 7/04 |

* cited by examiner

*Primary Examiner* — Thomas K Pham
*Assistant Examiner* — Nicholas Pasko
(74) *Attorney, Agent, or Firm* — Baker & McKenzie LLP (57) ABSTRACT

A lens barrel includes a barrel wall disposed about a longitudinal axis, an external thread continuously formed on the barrel wall and having a continuous crest, and two parting lines that are longitudinally formed on the external thread and that are symmetrical about the longitudinal axis. A projection of the crest of the external thread on a plane orthogonal to the longitudinal axis has a maximum diameter and a minimum diameter. A difference between the maximum and minimum diameters is between 0.04 mm and 0.18 mm. Each of the two parting lines is disposed on portions of the external thread that define the minimum diameter.

18 Claims, 11 Drawing Sheets

LENS BARREL AND LENS MODULE

CROSS-REFERENCE TO RELATED APPLICATION

This application claims priority to Taiwanese Application No. 101101945, filed on Jan. 18, 2012.

BACKGROUND OF THE INVENTION

1. Field of the Invention

The invention relates to a lens barrel, and more particularly to a lens barrel that solves flash issue and that does not need vent holes.

2. Description of the Related Art

A lens barrel of a conventional lens module has flashes on a parting line after injection molding. When the lens barrel is bolted with a holder, the flashes on an external thread of the lens barrel rub against an internal thread of the holder to thereby result in powder pollution, which is called a flash issue.

Figure 1:
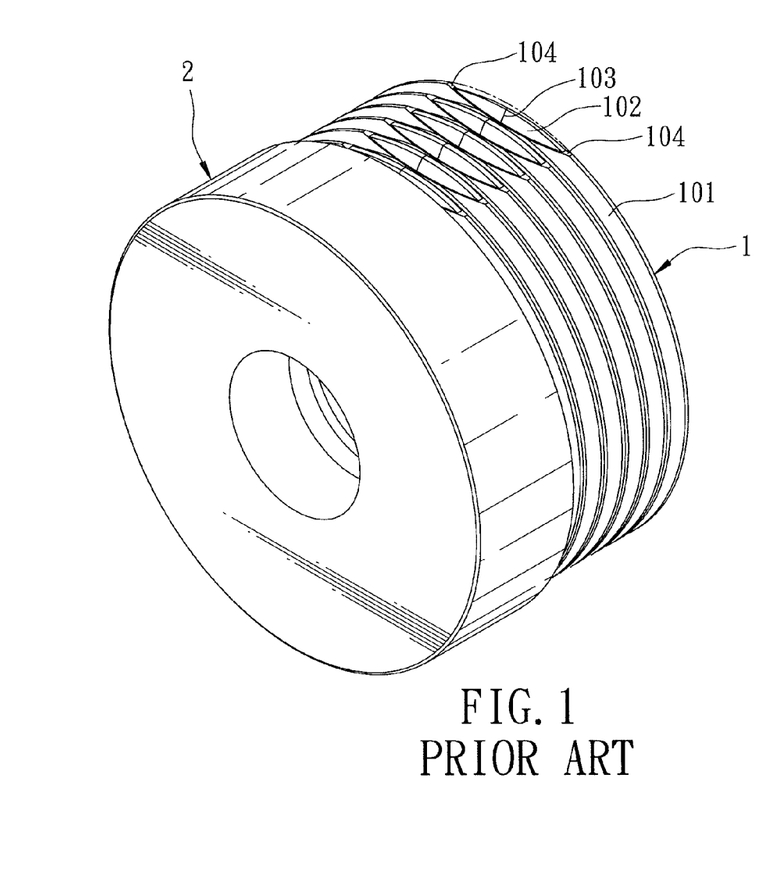
FIG. 1 is a perspective view showing a conventional lens barrel.
Figure 2:
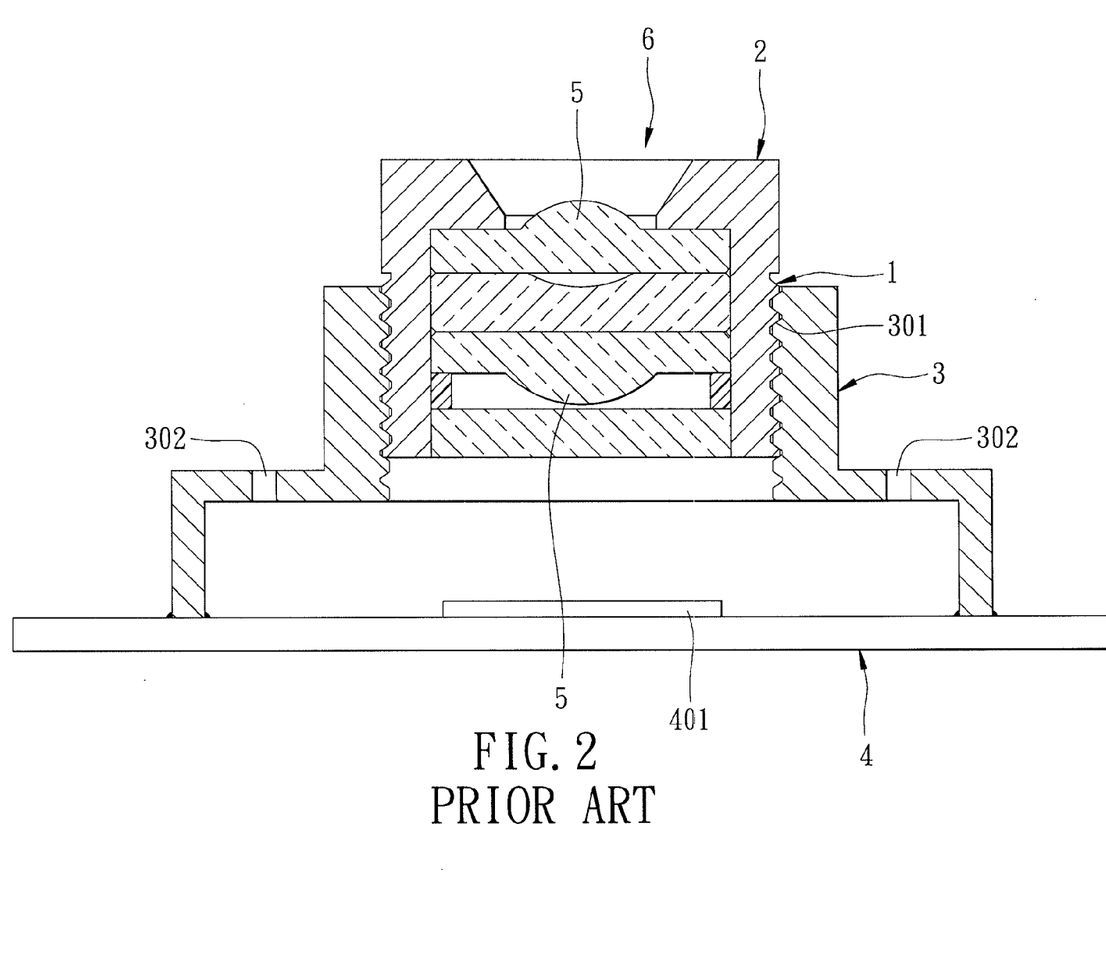
FIG. 2 is a sectional view of an assembly of the conventional lens barrel, a holder, and a plate.

Referring to FIG. 1 and FIG. 2, a thread structure 1 (disclosed in U.S. Pat. No. 7,565,078 B2) is proposed to diminish powder pollution caused by the flash issue. Each circle of the thread structure 1 has a normal thread 101, and a partial withdraw thread 102 that is located along a longitudinal parting line 103.

When the thread structure 1 is assembled with an internal thread 301 of a holder 3, flashes at the parting line 103 do not rub against the internal thread 301, so that the powder pollution does not occur. However, a difference between the edge of the normal thread 101 and that of the partial withdraw thread 102 is greater than 0.03 mm in a radial direction, and thus forms a clearance surface 104 between an outer edge of the normal thread 101 and the partial withdraw thread 102, resulting in accumulation of powders on the clearance surface 104. That is, powders produced due to rubbing between the normal thread 101 and the internal thread 301 easily accumulate on the clearance surfaces 104, and fall off during repeated threading assembly and disassembly in rework processes which may result in pollution of an imaging sensor, such as a surface powder pollution issue of a complementary metal-oxide-semiconductor (CMOS) imaging sensor.

Moreover, formation of the clearance surface 104 between the normal thread 101 and the partial withdraw thread 102 can lead to the situation that the demand of torque in an assembling process is non-continuous torque.

As shown in FIG. 2, when an assembly, which is composed of the holder 3 and a camera lens 6 that includes a lens barrel 2 and a plurality of lenses 5, is installed on a plate 4 having an imaging sensor 401 thereon, the holder 3 is typically fixed on the plate 4 by applying a glue therebetween and then subsequently baking the glue. The holder 3 needs several vent holes 302 to discharge the hot air generated in the baking process. Thereafter, the vent holes 302 are sealed by filling with glue. FIG. 2 shows a condition before filling glue into the vent holes 302. During the glue applying and baking process, powders may fall into the vent holes 302 to result in surface powder pollution on the imaging sensor 401. Moreover, control of glue quantity is difficult. If the filled glue is insufficient, electro-magnetic interference to the imaging sensor 401 and electrostatic discharge issue may occur. If the filled glue is too much, it may overflow.

SUMMARY OF THE INVENTION

Therefore, an object of the present invention is to provide a lens barrel that can solve the flash issue.

According to one aspect of the present invention, a lens barrel comprises a barrel wall disposed about a longitudinal axis, an external thread continuously formed on the barrel wall and having a continuous crest, and two parting lines that are longitudinally formed on the external thread and that are symmetrical about the longitudinal axis. A projection of the crest of the external thread on a plane orthogonal to the longitudinal axis has a maximum diameter and a minimum diameter. A difference between the maximum and minimum diameters is between 0.04 mm and 0.18 mm. Each of the two parting lines is disposed on portions of the external thread that define the minimum diameter.

Another object of the present invention is to provide a lens module that can solve the flash issue and that does not need vent holes required in the prior art.

According to another aspect of the present invention, a lens module comprises a holder and a lens barrel. The holder has an inner peripheral surface, and an internal thread formed on the inner peripheral surface. The lens barrel is assembled with the holder. The lens barrel has a barrel wall disposed about a longitudinal axis, an external thread continuously formed on the barrel wall and having a continuous crest, and two parting lines that are longitudinally formed on the external thread and that are symmetrical about the longitudinal axis. A projection of the crest of the external thread on a plane orthogonal to the longitudinal axis has a maximum diameter and a minimum diameter. A difference between the maximum and minimum diameters is between 0.04 mm and 0.18 mm. Each of the two parting lines is disposed on portions of the external thread that define the minimum diameter, so as not to contact the internal thread of the holder.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the preferred embodiments, it should be noted herein that similar components are denoted by the same reference numerals in the following description.

Figure 3:
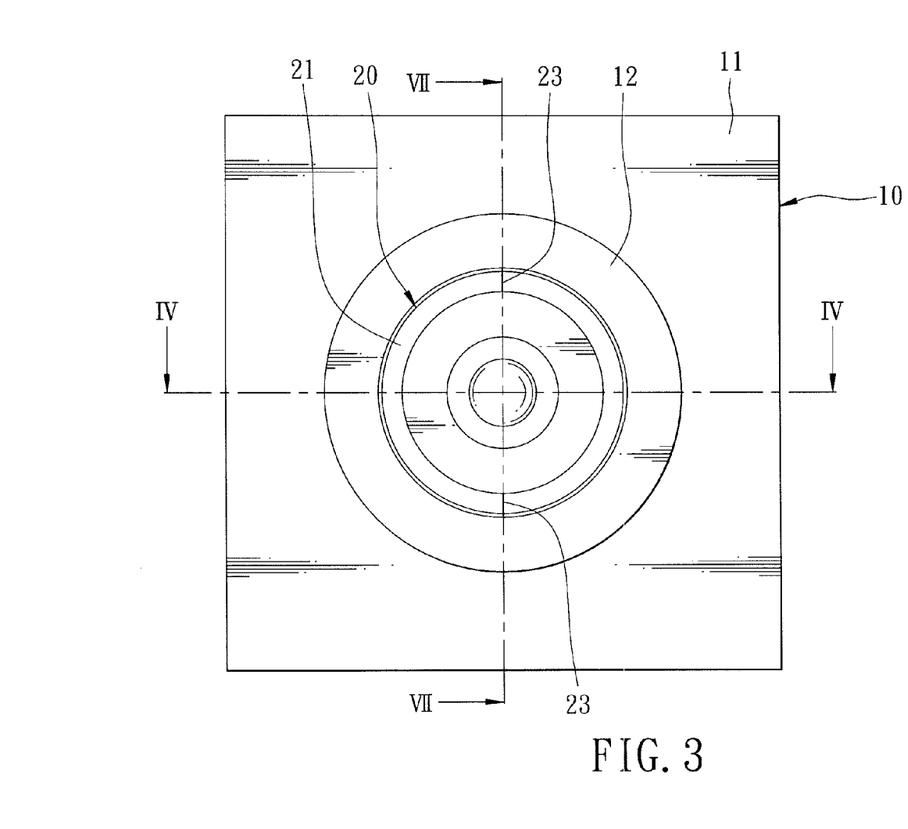
FIG. 3 is a front view showing a first preferred embodiment of the lens module according to the present invention.
Figure 4:
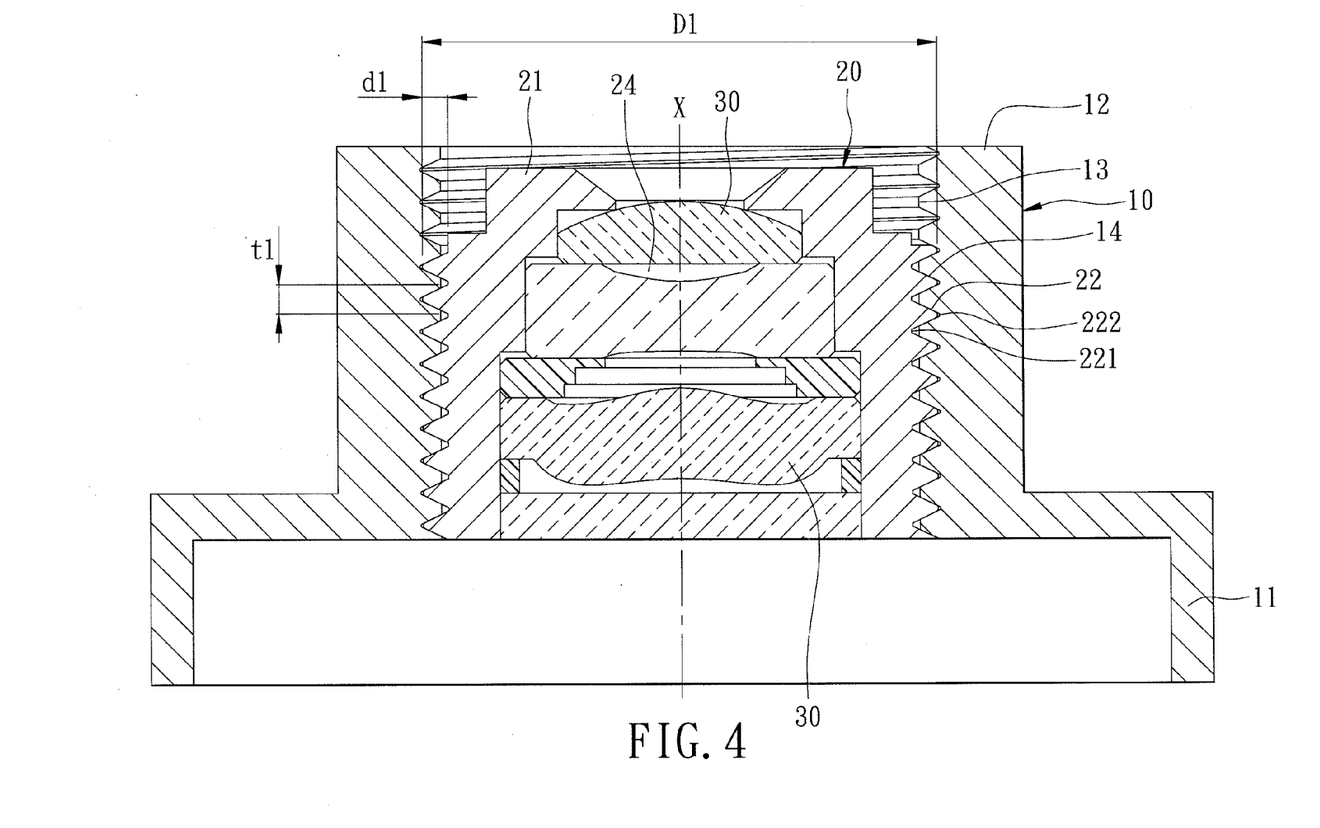
FIG. 4 is a sectional view of the lens module shown in FIG. 3 taken along line IV-IV.

Referring to FIG. 3 and FIG. 4, the first preferred embodiment of the lens module according to this invention is shown to include a holder 10, a lens barrel 20, and a plurality of lenses 30.

The holder 10 has a base portion 11 excluding any vent hole therefrom, a cask 12 disposed above the base portion 11, an internal peripheral surface 13, and an internal thread 14 formed on the inner peripheral surface 13.

Figure 5:
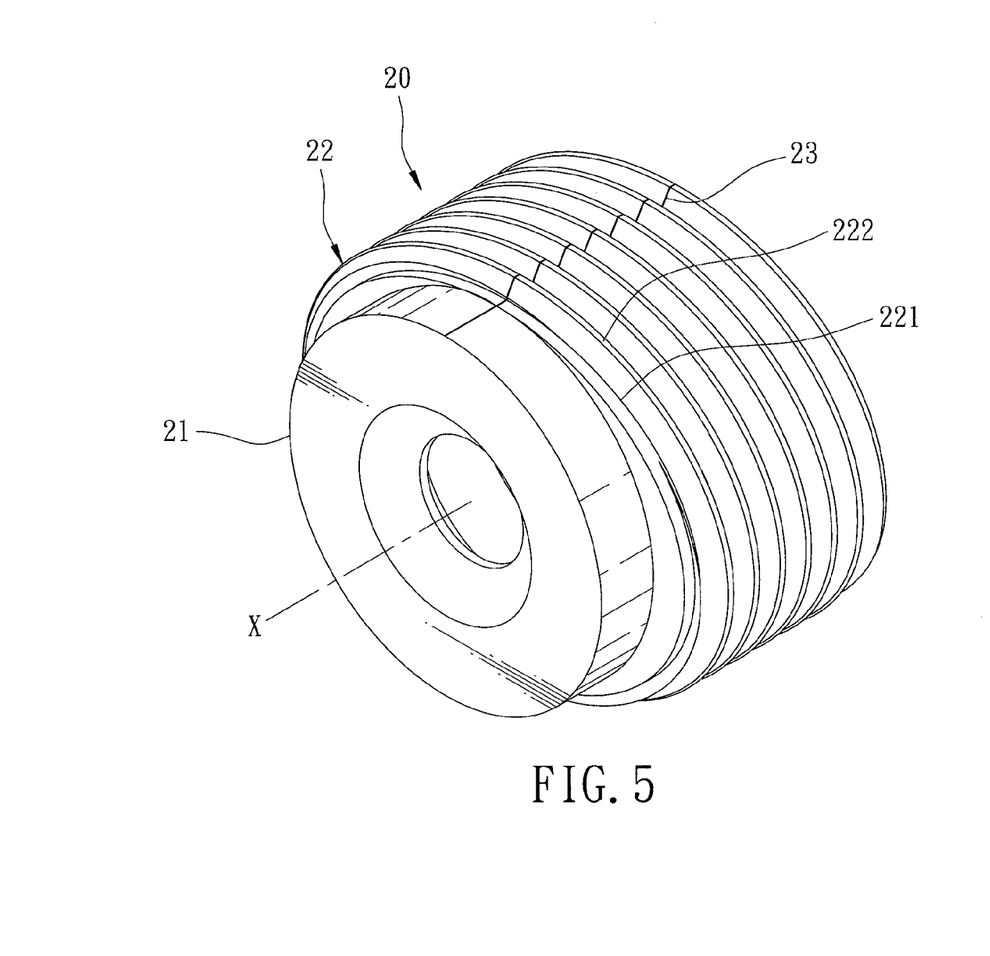
FIG. 5 is a perspective view showing the lens barrel of the first preferred embodiment.
Figure 6:
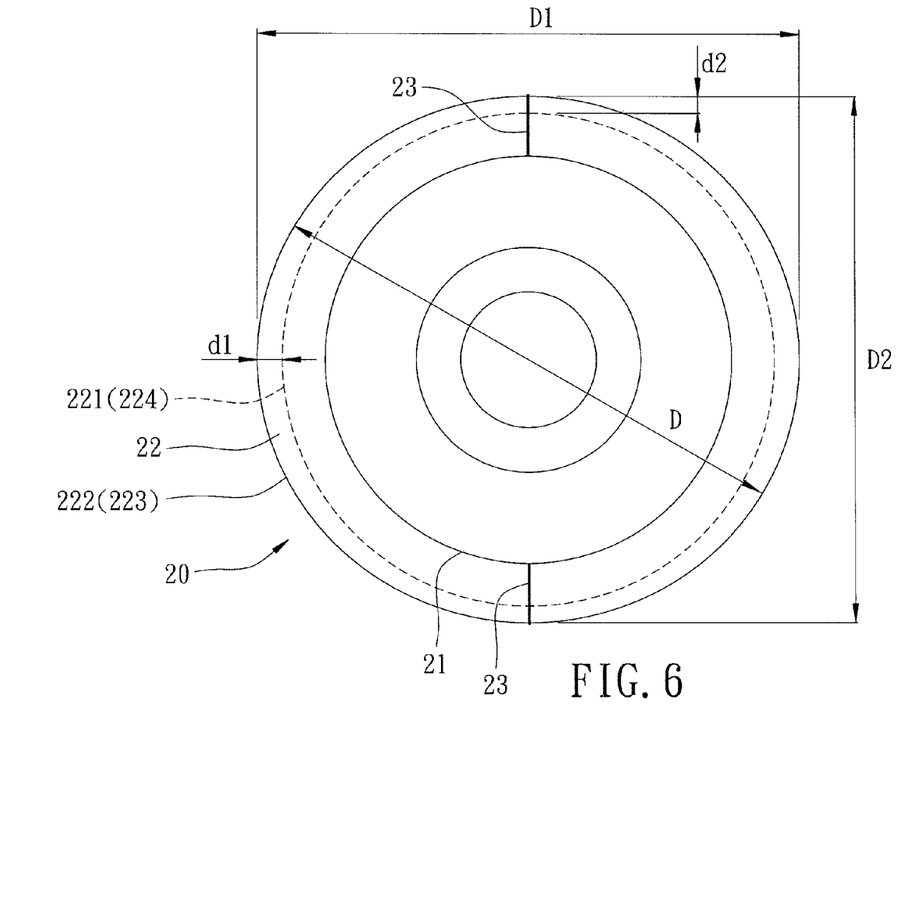
FIG. 6 is a front view of the lens barrel shown in FIG. 5.

As shown in FIGS. 4, 5, and 6, the lens barrel 20 is assembled with the holder 10 and is shaped as a cylinder. The lens barrel 20 has a barrel wall 21 disposed about a longitudinal axis (X-axis) and defining an accommodation space 24, an external thread 22 continuously formed on the barrel wall 21, and two parting lines 23 that are longitudinally formed on the external thread 22 and that are symmetrical about the X-axis.

The lenses 30 include a plurality of optical lenses and a piece of flat glass, and are disposed in the accommodating space 24 of the lens barrel 20.

The external thread 22 has a root 221 disposed at a bottom thereof, and a continuous crest 222 disposed at a top thereof.

A projection 223 of the crest 222 of the external thread 22 on a plane orthogonal to the X-axis has a non-uniform outer diameter D. The outer diameter D includes a maximum diameter D1 and a minimum diameter D2. A difference between the maximum diameter D1 and the minimum diameter D2 is between 0.04 mm and 0.18 mm. Each of the two parting lines 23 is disposed on portions of the external thread 22 that define the minimum diameter D2, so as not to contact the internal thread 14 of the holder 10.

In this embodiment, with reference to FIG. 6, when viewed from the front, the projection 223 of the crest 222 of the external thread 22 on the plane orthogonal to the X-axis is an ellipse, and the projection 224 of the root 221 of the external thread 22 on the plane orthogonal to the X-axis is a circle. The maximum diameter D1 is equal to the length of a major axis of the ellipse, and is 6.50 mm. The minimum diameter D2 is equal to the length of a minor axis of the ellipse, and is 6.44 mm. The outer diameter D of the projection 223 is continuously and gradually reduced from the maximum diameter D1 to the minimum diameter D2, and the difference therebetween is 0.06 mm.

It should be noted that, in this embodiment, the external thread 22 is an international standard metric thread M6.5X0.35, so that the external thread 22 is generally V-shaped in cross-section, the crest thereof is flat, and the root thereof is an arc. Therefore, the crest 222 is a continuous top thread surface, and the root 221 is a continuous bottom thread surface. Additionally, in the figures, for the sake of clarity, the difference between the maximum diameter D1 and the minimum diameter D2 is exaggerated, that is, the difference shown in figures is not an actual scale.

Figure 7:
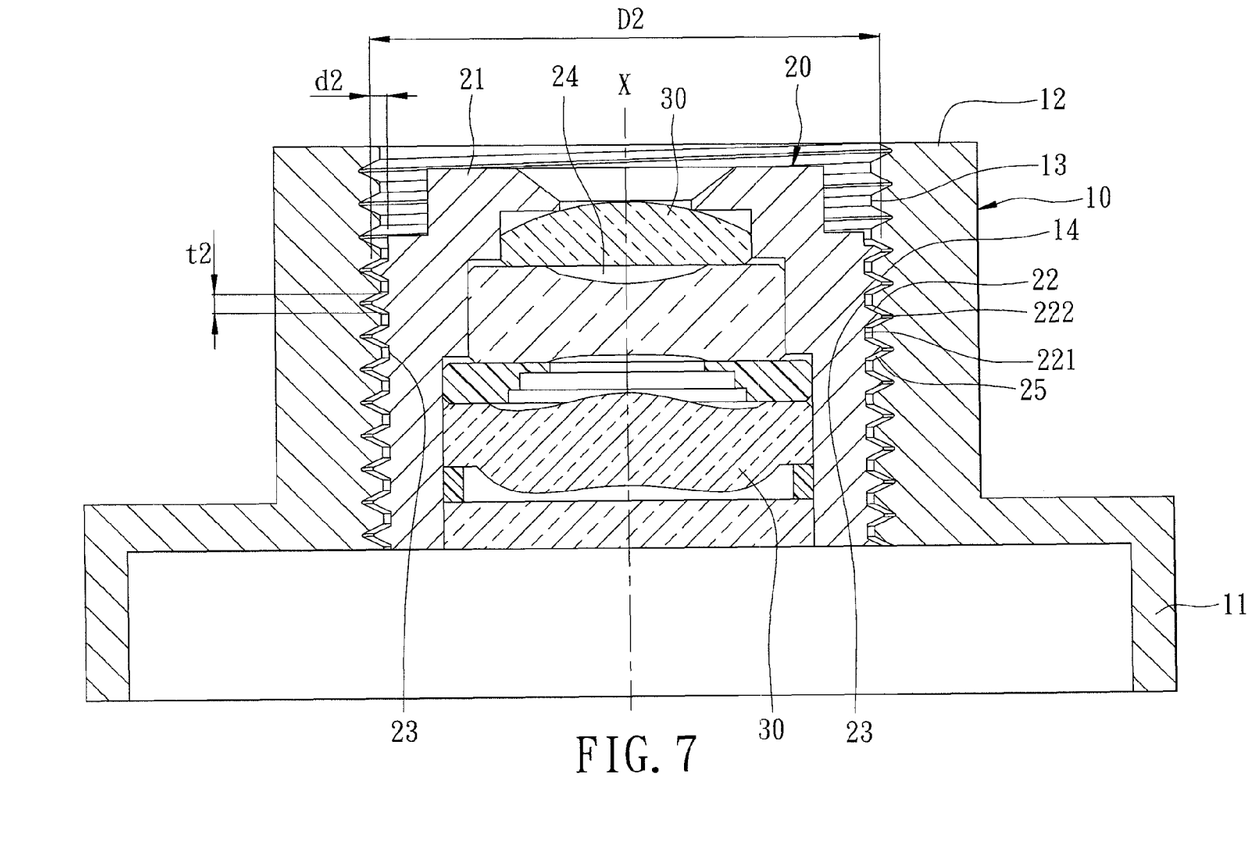
FIG. 7 is a sectional view of the lens module shown in FIG. 3 taken along line VII-VII.

Referring to FIG. 4 and FIG. 7, the external thread 22 has a first axial root thickness t1 at portions thereof that define the maximum diameter D1, and has a second axial root thickness t2 at portions thereof that define the minimum diameter D2. The first axial root thickness t1 is greater than the second axial root thickness t2.

The external thread 22 has a first radial thread depth d1 at the portions thereof that define the maximum diameter D1, and has a second radial thread depth d2 at the portions thereof that define the minimum diameter D2. The first radial thread depth d1 is greater than the second radial thread depth d2. In this embodiment, d1=d2+0.03 mm.

The external thread 22 is in contact with the internal thread 14 at the portions thereof that define the maximum diameter D1, and does not contact the internal thread 14 at the portions thereof that define the minimum diameter D2, thereby forming a gap 25.

Further referring to FIG. 6, in this embodiment, since the parting lines 23 are disposed on the portions of the external thread 22 that define the minimum diameter D2, the minimum diameter D2 cannot be directly measured due to the presence of flashes on the parting lines 23. Typically, the size of a flash on a parting line 23 is about 0.01~0.015 mm, so that the sum of the flash size on both parting lines 23 is about 0.02~0.03 mm. Accordingly, the minimum diameter D2 is obtained by deducting the flash size (0.02~0.03 mm) on both parting lines 23 from the measured value. Since the parting lines 23 extend along the portions of the external thread 22 that define the minimum diameter D2, and since the gap 25 is formed between the internal thread 14 and the portions of the external thread 22, the parting lines 23 do not contact the internal thread 14 when the lens barrel 20 is assembled with the holder 10.

From FIG. 4 and FIG. 7, it is known that, if the difference between the maximum diameter D1 and the minimum diameter D2 is smaller than 0.04 mm, flashes on the parting lines 23 disposed at the portions of the external thread 22 that define the minimum diameter D2 may rub against the internal thread 14 of the holder 10 to thereby generate powders. On the other hand, when the difference between the maximum diameter D1 and the minimum diameter D2 is greater than 0.18 mm, the gap 25 formed between the internal thread 14 and the portions of the external thread 22 that define the minimum diameter D2 is too large. In this case, the radial width of the gap 25 is greater than 0.18 mm/2=0.09 mm, so that powders may easily fall onto the bottom of the holder 10 to result in powder pollution. Therefore, the optimum difference between the maximum diameter D1 and the minimum diameter D2 is between 0.04 mm and 0.18 mm, so as to prevent generation of powders, and so that, when fixing the holder 10 on a plate (not shown) by a glue applying and baking process, the hot air generated can be discharged through the gap 25.

To conclude, the lens module of this embodiment is advantageous for the following reasons:

1. The outer diameter D of the external thread 22 of the lens barrel 20 of this embodiment changes continuously, and has a maximum diameter D1 and a minimum diameter D2. When the lens barrel 20 is assembled with the holder 10, the portions of the external thread 22 that define the maximum diameter D1 contact the internal thread 14, while the portions of the external thread 22 that define the minimum diameter D2 do not contact the internal thread 14. As such, flashes on the parting lines 23 do not rub against the internal thread 14 during assembly, thereby solving the flash issue.

2. The external thread 22 of the lens barrel 20 has a continuous crest 222, and is continuously formed on the barrel wall 21. Thus, the external thread 22 does not have a discontinuous change in diameter as encountered in the prior art (such as U.S. Pat. No. 7,565,078 B2), so as to prevent accumulation of powders and to obtain good control in an assembling process due to continuity of torque variation.

3. As shown in FIG. 7, when the lens barrel 20 is assembled with the holder 10, the portions of the external thread 22 that define the minimum diameter D2 do not contact the internal thread 14, thus forming the gap 25. In the glue applying and baking process for fixing the holder 10 on the plate, the hot air can be discharged through the gap 25. The lens barrel 20 can thus omit the vent holes used in the prior art. Because the gap 25 is zigzag, issues of light leakage, powder pollution, electromagnetic interference, and electrostatic discharge encountered in the prior art can be solved by the present invention.

Figure 8:
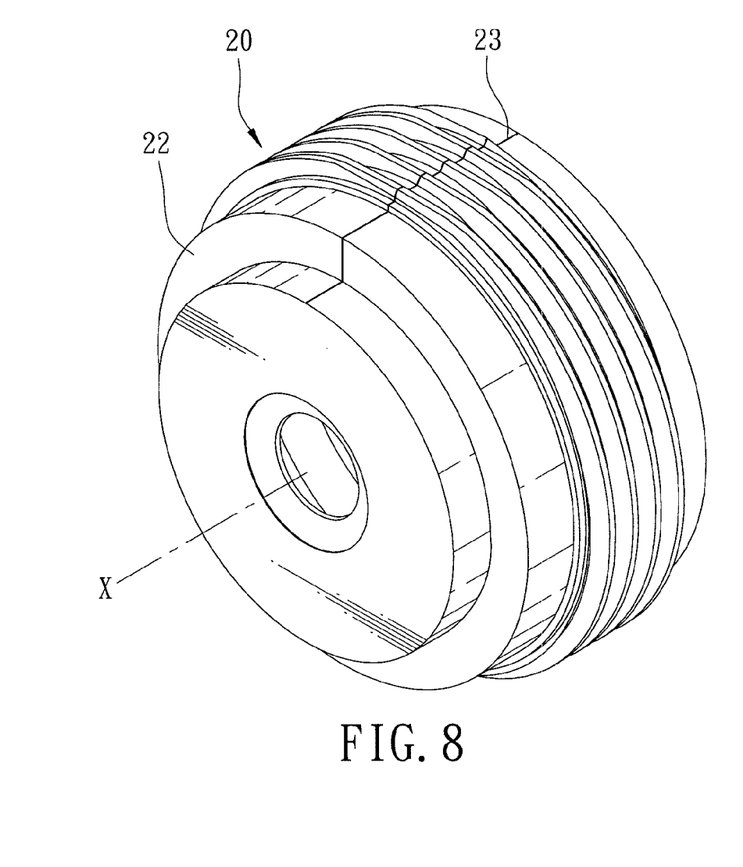
FIG. 8 is a perspective view showing a second preferred embodiment of the lens barrel according to the present invention.
Figure 9:
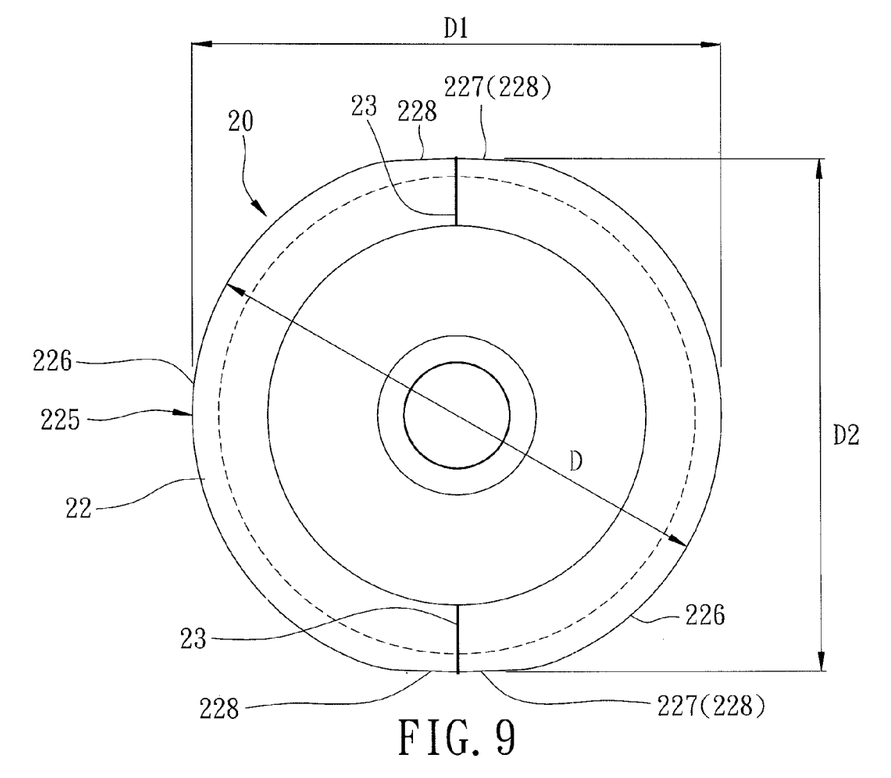
FIG. 9 is a front view of the lens barrel shown in FIG. 8.
Figure 10:
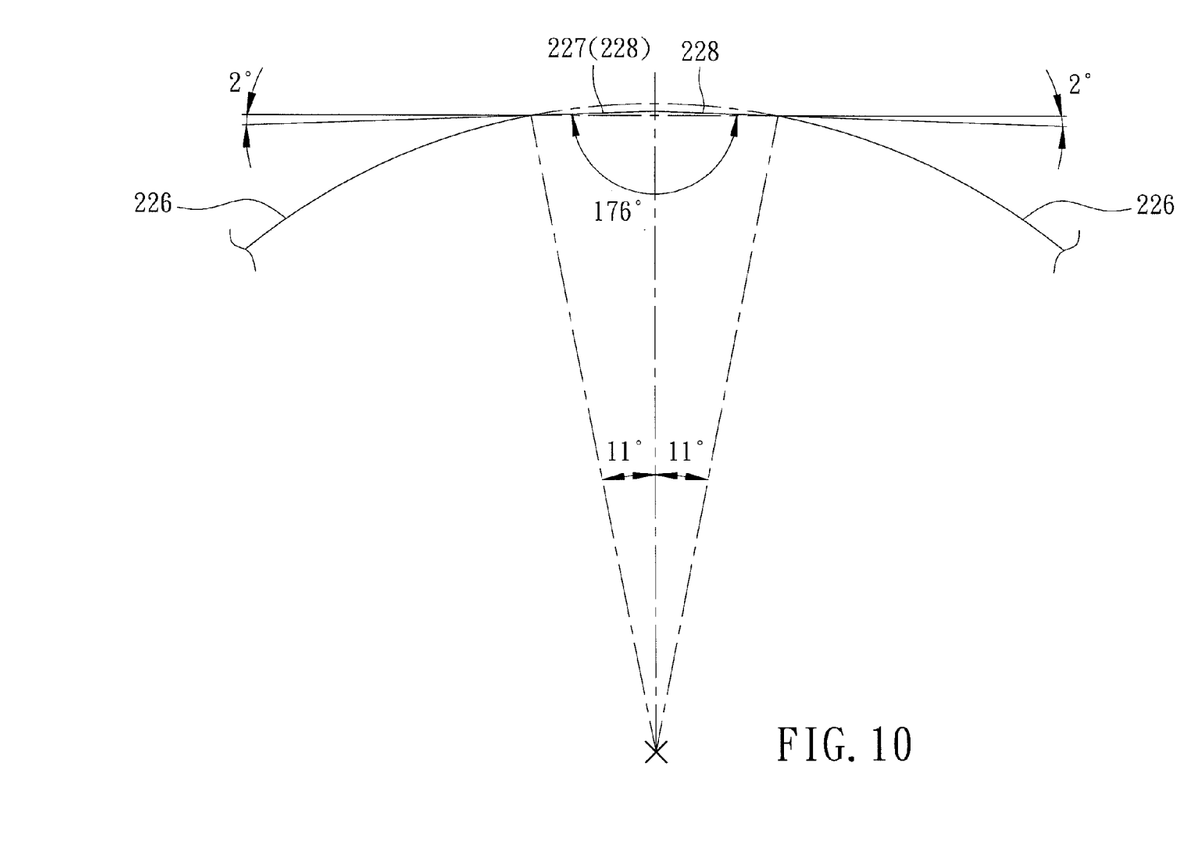
FIG. 10 is an enlarged view of a portion of FIG. 9.

FIG. 8 to FIG. 10 illustrate a second preferred embodiment of a lens barrel 20 according to the present invention. The projection 225 of the external thread 22 on the plane orthogonal to the X-axis has two opposite arc portions 226 defining the maximum diameter D1, and has two opposite withdraw portions 227 that define the minimum diameter D2 and that interconnect the two arc portions 226. The arc portions 226 have a uniform curvature radius. In this embodiment, the maximum diameter D1 is 6.50 mm, which is twice the uniform curvature radius, and the minimum diameter D2 is 6.36 mm. Because the difference between the maximum diameter D1 and the minimum diameter D2 is 0.14 mm, flashes on the parting lines 23 do not rub with the internal thread 14, so as to solve the flash issue.

In this embodiment, each of the withdraw portions 227 has two straight portions 228 that form an angle being slightly smaller than 180 degrees therebetween and that intersect at an endpoint, through which a corresponding one of the parting lines 23 passes. The angle formed by the two straight portions 228 is 176 degrees. Each straight portion 228 forms a center angle of 11 degrees with respect to a circle center of the arc portions 226. Each straight portion 228 has a stripping angle of 2 degrees to facilitate mold stripping.

Figure 11:
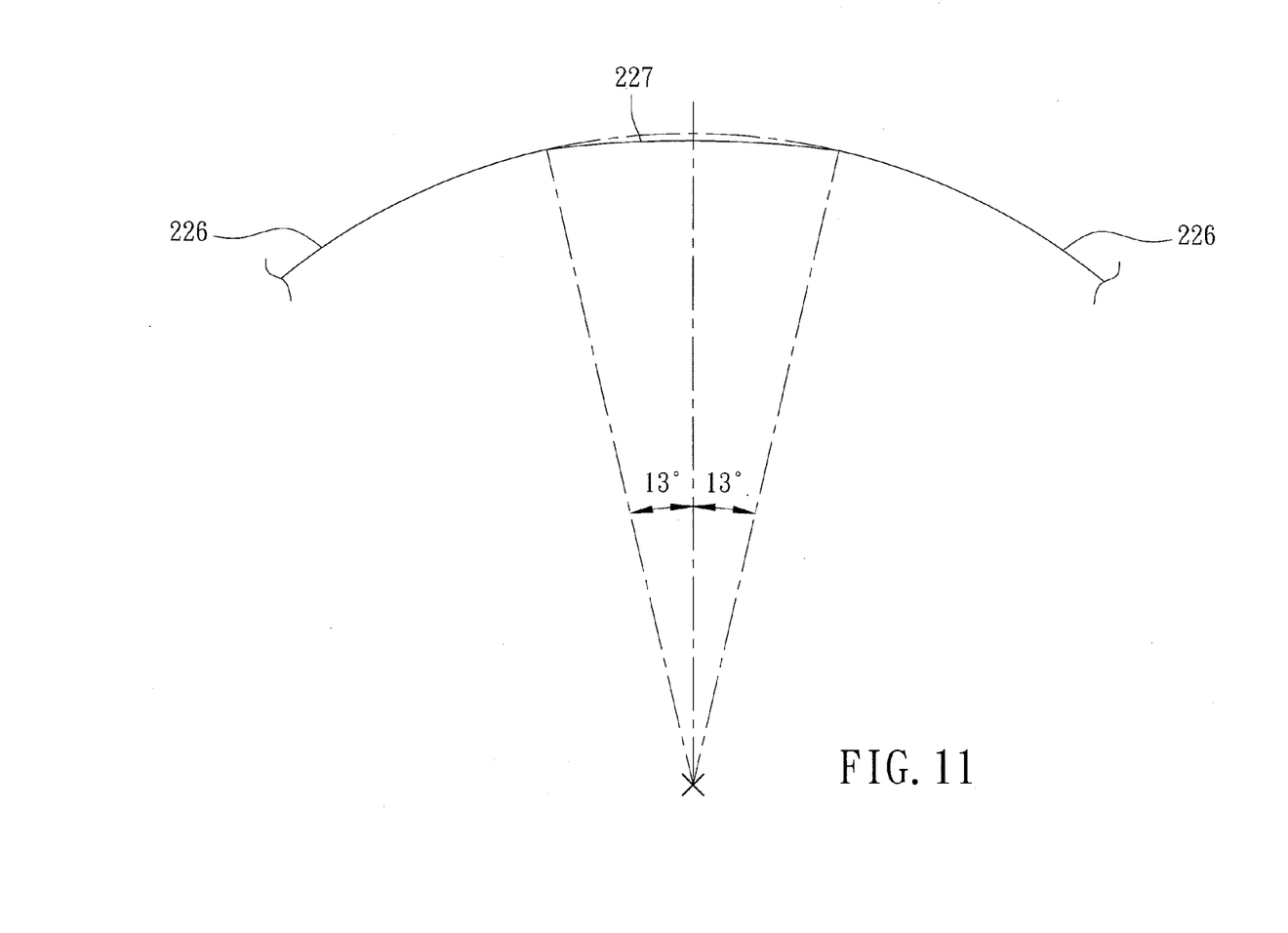
FIG. 11 is a front view illustrating a modification of the portion of FIG. 9.

Referring to FIG. 11, which illustrates a modification of the second preferred embodiment, the withdraw portions 227 are arcs. Each withdraw portion 227 has a radius of 20.10 mm, and forms a center angle of 13 degrees with respect to a circle center of the arc portions 226. In this embodiment, because the difference between the maximum diameter D1 and the minimum diameter D2 is 0.14 mm, flashes on the parting lines 23 do not rub with the internal thread 14, so as to solve the flash issue.

To sum up, the lens barrel and the lens module of this invention can prevent powder pollution from rubbing of flashes, can omit need to form vent holes in the holder, and can have good control of torque.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A lens barrel comprising a barrel wall disposed about a longitudinal axis, an external thread continuously formed on said barrel wall and having a continuous crest, and two parting lines that are longitudinally formed on said external thread and that are symmetrical about the longitudinal axis, wherein a projection of said crest of said external thread on a plane orthogonal to the longitudinal axis has a maximum diameter and a minimum diameter, a difference between the maximum and minimum diameters being between 0.04 mm and 0.18 mm and the transition between said maximum and minimum diameters is continuous, each of said two parting lines being disposed on portions of said external thread that define the minimum diameter.

2. The lens barrel as claimed in claim 1, wherein the projection of said crest of said external thread on the plane orthogonal to the longitudinal axis is an ellipse, said maximum diameter being equal to the length of a major axis of the ellipse, said minimum diameter being equal to the length of a minor axis of the ellipse.

3. The lens barrel as claimed in claim 2, wherein said external thread has a first axial root thickness at portions thereof that define the maximum diameter, and has a second axial root thickness at the portions thereof that define the minimum diameter, said first axial root thickness being greater than said second axial root thickness.

4. The lens barrel as claimed in claim 3, wherein said external thread has a first radial thread depth at the portions thereof that define the maximum diameter, and a second radial thread depth at the portions thereof that define the minimum diameter, said first radial thread depth being greater than said second radial thread depth.

5. The lens barrel as claimed in claim 1, wherein the projection of said external thread on the plane orthogonal to the longitudinal axis has two opposite arc portions defining the maximum diameter, and has two opposite withdraw portions that define the minimum diameter and that interconnect said two arc portions, said arc portions having a uniform curvature radius.

6. The lens barrel as claimed in claim 5, wherein said two withdraw portions are arcs, respectively.

7. The lens barrel as claimed in claim 5, wherein each of said withdraw portions has two straight portions that form an interior angle of the projection of said external thread on the plane orthogonal to the longitudinal axis therebetween, and that intersect at an endpoint, through which a corresponding one of said parting lines passes, the interior angle being slightly smaller than 180 degrees.

8. The lens barrel as claimed in claim 5, wherein said external thread has a first axial root thickness at portions thereof that define the maximum diameter, and has a second axial root thickness at the portions thereof that define the minimum diameter, said first axial root thickness being greater than said second axial root thickness.

9. The lens barrel as claimed in claim 8, wherein said external thread has a first radial thread depth at the portions thereof that define the maximum diameter, and a second radial thread depth at the portions thereof that define the minimum diameter, said first radial thread depth being greater than said second radial thread depth.

10. A lens module comprising:
   a holder having an inner peripheral surface, and an internal thread formed on said inner peripheral surface; and
   a lens barrel assembled with said holder, said lens barrel having a barrel wall disposed about a longitudinal axis, an external thread continuously formed on said barrel wall and having a continuous crest, and two parting lines that are longitudinally formed on said external thread and that are symmetrical about the longitudinal axis, wherein a projection of said crest of said external thread on a plane orthogonal to the longitudinal axis has a maximum diameter and a minimum diameter, a difference between the maximum and minimum diameters being between 0.04 mm and 0.18 mm and the transition between said maximum and minimum diameters is continuous, each of said two parting lines being disposed on portions of said external thread that define the minimum diameter, so as not to contact said internal thread of said holder.

11. The lens module as claimed in claim 10, wherein the projection of said crest of said external thread on the plane orthogonal to the longitudinal axis is an ellipse, said maximum diameter being equal to the length of a major axis of the ellipse, said minimum diameter being equal to the length of a minor axis of the ellipse.

12. The lens module as claimed in claim 11, wherein said external thread has a first axial root thickness at portions thereof that define the maximum diameter, and has a second axial root thickness at the portions thereof that define the minimum diameter, said first axial root thickness being greater than said second axial root thickness.

13. The lens module as claimed in claim 12, wherein said external thread has a first radial thread depth at the portions thereof that define the maximum diameter, and a second radial thread depth at the portions thereof that define the minimum diameter, said first radial thread depth being greater than said second radial thread depth.

14. The lens module as claimed in claim 10, wherein the projection of said external thread on the plane orthogonal to the longitudinal axis has two opposite arc portions defining the maximum diameter, and has two opposite withdraw portions that define the minimum diameter, and that interconnect said two arc portions, said arc portions having a uniform curvature radius.

15. The lens module as claimed in claim 14, wherein said two withdraw portions are arcs, respectively.

16. The lens module as claimed in claim 14, wherein each of said withdraw portions has two straight portions that form an interior angle of the projection of said external thread on the plane orthogonal to the longitudinal axis therebetween, and that intersect at an endpoint, through which a corresponding one of said parting lines passes, the interior angle being slightly smaller than 180 degrees.

17. The lens module as claimed in claim 14, wherein said external thread has a first axial root thickness at portions thereof that define the maximum diameter, and a second axial root thickness at the portions thereof that define the minimum diameter, said first axial root thickness being greater than said second axial root thickness.

18. The lens module as claimed in claim 17, wherein said external thread has a first radial thread depth at the portions thereof that define the maximum diameter, and a second radial thread depth at the portions thereof that define the minimum diameter, said first radial thread depth being greater than said second radial thread depth.

* * * * *